UNITED STATES PATENT OFFICE.

OSCAR A. EBERBACH, OF ANN ARBOR, MICHIGAN, ASSIGNOR OF ONE-HALF TO WALDEMAR C. KLOTZ, OF DETROIT, MICHIGAN.

WATER-SOFTENING COMPOUND.

1,001,935.  Specification of Letters Patent.  Patented Aug. 29, 1911.

No Drawing.   Application filed April 17, 1911.  Serial No. 621,589.

*To all whom it may concern:*

Be it known that I, OSCAR A. EBERBACH, a citizen of the United States, and a resident of Ann Arbor, in the county of Washtenaw and State of Michigan, have invented a new Water-Softening Compound, of which the following is a specification.

This invention relates to means for softening water for manufacturing and domestic uses, principally the latter and, its object is to provide a compound, which when dissolved in water holding alkaline earths in solution, will precipitate the minerals and thus "soften" the water.

It has been found that the phosphates of the alkalies alone will not readily precipitate the alkaline earths in solution in water. Active ammonia compounds give to the phosphates a peculiar affinity for lime and magnesia earths in solution. It has also been found that certain non-volatile ammonia compounds, such as sulfate and chlorid, which normally are inactive for this purpose, may be rendered active and free by soda-ash.

Sulfate of ammonia and soda-ash are both extremely stable under normal conditions, but in the presence of water, the soda-ash renders the ammonia active, resulting in a proper alkaline solution which permits alkali phosphates to combine more readily with the alkaline earths in the water, and precipitate them as phosphates of lime and magnesia.

The fact that phosphates of sodium such as tri-sodium phosphate or di-sodium-hydrogen-phosphate, sulfate of ammonia and soda-ash are inactive when dry and not normally liable to affect each other, renders the compound especially desirable as a merchantable water-softener, as it can be vended in inexpensive paper boxes. The preferred proportions are substantially trisodium phosphate 75 parts, sulfate of ammonia 8 parts, and soda-ash 17 parts, although these proportions may be varied to meet particular requirements. A teaspoonful of the compound will usually render ten gallons of medium hard water fit for laundry purposes and render twenty gallons fit for bathing purposes. The amounts used may however be varied according to the hardness of the water and the earths in solution.

Having now explained the composition of the water softener and the use of the same, what I claim as my invention and desire to secure by Letters Patent is:—

1. A water-softening compound consisting of a phosphate of an alkaline metal, normally nonvolatile normally - inactive compound of ammonia and means to render the ammonia compound active when in the presence of water.

2. A water-softening compound consisting of a phosphate of sodium, a non-volatile normally-inactive compound of ammonia, and soda-ash.

3. A water-softening compound consisting of substantially seventy five parts of tri-sodium phosphate, eight parts of sulfate of ammonia, and seventeen parts of soda-ash.

In testimony whereof I have signed this specification in the presence of two subscribing witnesses.

OSCAR A. EBERBACH.

Witnesses:
LILLIE C. STAEB,
OSCAR H. HAARER.